Patented Aug. 18, 1953

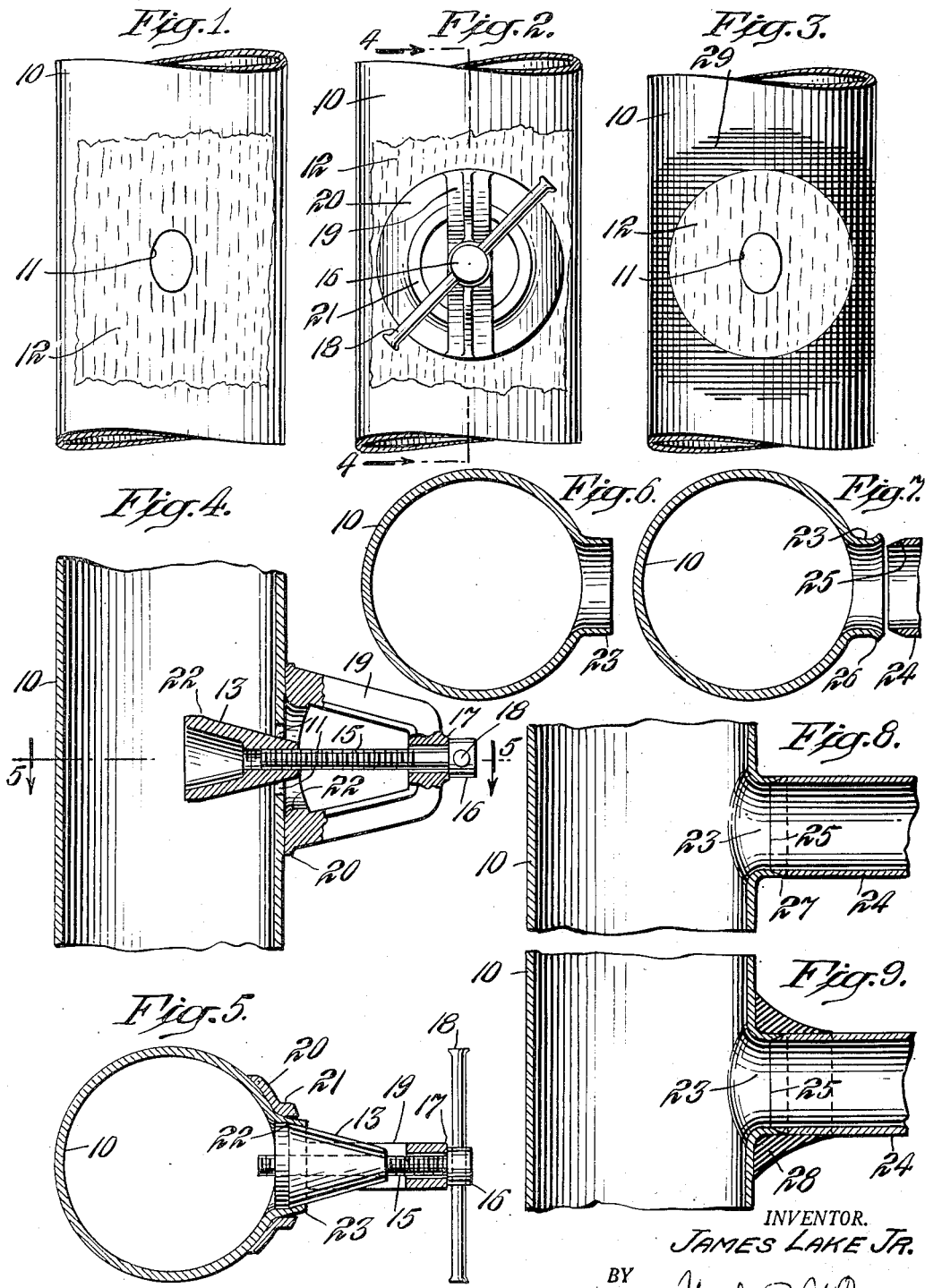

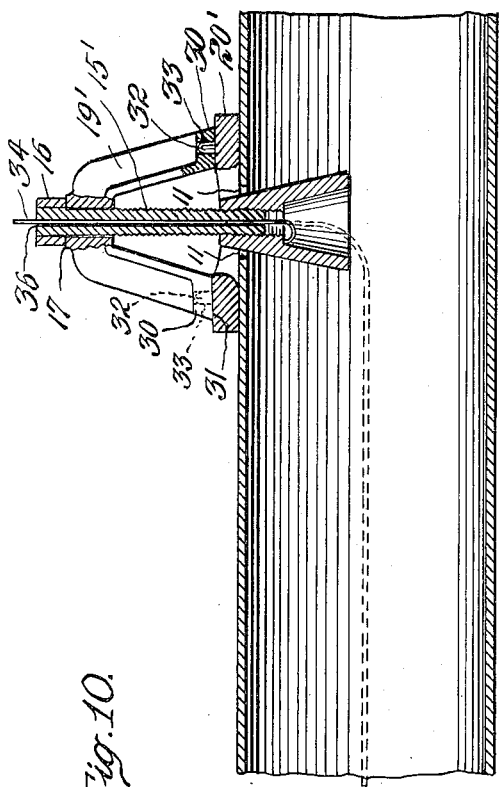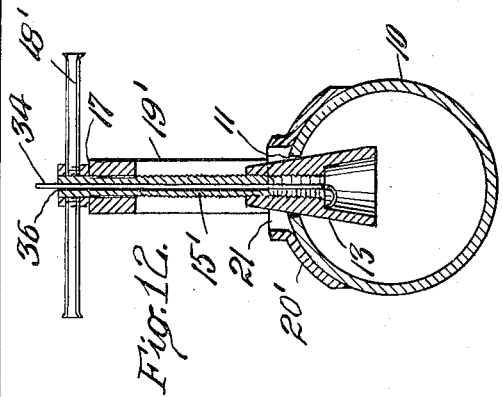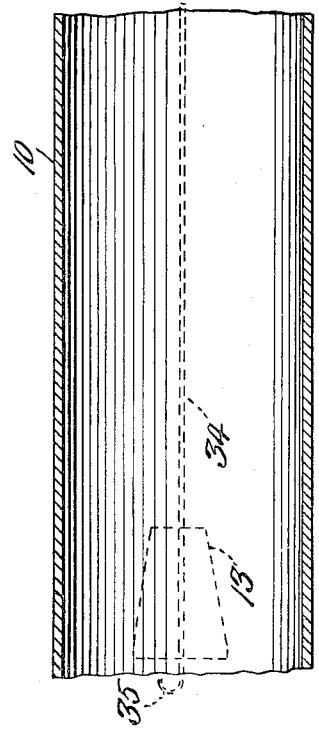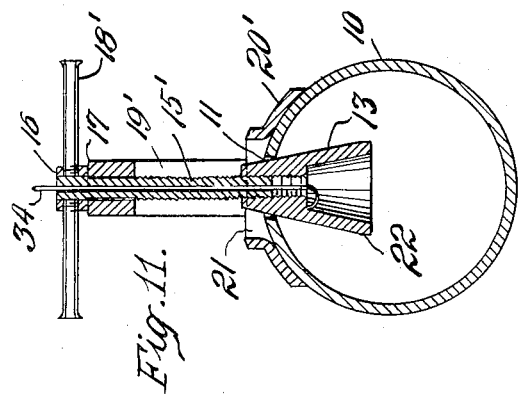

2,649,127

UNITED STATES PATENT OFFICE 2,649,127

TOOL FOR MAKING JOINTS IN LEAD PIPE

James Lake, Jr., Brooklyn, N. Y.

Application September 11, 1951, Serial No. 246,044

2 Claims. (Cl. 153—24)

The invention herein disclosed relates to the making of joints on lead pipe, and the special purposes of the invention are to provide a tool which will enable an operator to quickly draw out a flange around the opening cut in a lead pipe for the joining of the other pipe thereto.

It is proposed that this flanging tool be in a simple, rugged, inexpensive form but that it be such as to operate accurately to draw out a smooth, circular flange of substantially uniform wall thickness so as to insure a good, strong joint with the branch pipe.

Further special objects of the invention are to produce a joint with smooth, flush surfaces, free of ridges, wrinkles and the like.

Other special objects of the invention are to facilitate the operations of applying the "soil" which prevents spreading of the solder beyond the normal outline of the joint and to aid in wiping the solder smoothly and evenly over and about the joint.

Other desirable objects attained by the invention are set forth or will appear in the course of the following specification.

The drawing accompanying and forming part of the specification illustrates a present commercial embodiment of the invention and a present mode of using same. Structure and operations, however, may be modified and changed as regards the immediate disclosure, all within the true scope of the invention as hereinafter defined and claimed.

Fig. 1 in the drawings is a broken plan view of a piece of lead pipe having a pilot opening cut therein and the surface of the pipe scraped clean about the opening for adherence of the solder;

Fig. 2 is a similar view but showing the flanging tool applied over the pilot opening and the scraped surface of the pipe;

Fig. 3 is a similar view but with the tool removed after brushing on the soil about the joint area, this view indicating how the base of the tool may be used as a circular guide for the brushing on of this soil;

Fig. 4 is a broken sectional view on substantially the plane of line 4—4 of Fig. 2, showing the base of the tool applied over the pipe and the expanding cone at the inside of the pipe, just entering the pilot opening;

Fig. 5 is a broken cross sectional view on substantially the plane of line 5—5 of Fig. 4, showing the flange drawn out by the expanding cone and the movement of the cone nearly completed to the point where the tool may be removed by simply lifting it off the pipe;

Fig. 6 is a cross sectional view of the pipe with the completed flange;

Fig. 7 is a similar view showing the edge of the flange flared to accommodate the beveled edge of the connecting pipe;

Fig. 8 is a broken longitudinal sectional view showing the beveled end of the branch pipe entered into the flared mouth of the flange and the lip of the flange smoothed down over the outside of the branch pipe;

Fig. 9 is a similar view of the completed joint with the solder wiped on smoothly and uniformly about the joined pipe.

Fig. 10 is a broken sectional view showing a modified form of the tool for making joints at some distance from the end of the pipe;

Figs. 11 and 12 are cross sectional views showing how the tool may be made with interchangeable base sections to fit different sizes of pipe.

In Fig. 1 a piece of lead pipe is indicated at 10, having a pilot opening 11 cut therein at the point where the joint is to be made, and the area 12 about this opening scraped clean to take the solder.

The pilot opening may be made with a tap borer and the pipe be scraped either before or after this opening is made.

The size of opening 11 may be relatively small as regards the final diameter of the flange which is to be drawn.

In the illustration, opening 11 is just large enough to admit the smaller end of the flange drawing cone 13. This cone has a screw seat 14 in the smaller end of the same to take the pull screw 15 having a head 16 bearing against a supporting shoulder 17 at the outside of the pipe. A rod 18 sliding through the head 16 serves as a handle for turning the screw.

The supporting shoulder 17 which takes the thrust of the pull screw, is provided by an arch or truss 19 carried by an annular base structure 20 which is concaved to closely fit the curvature of the pipe.

This base ring forms, in effect, a "saddle," seating on the pipe and supporting the screw outwardly of the pipe at a point where it may operate to fully draw the expanding cone out through the flange formed about the pilot opening.

The inner edge of the base ring is shown rounded at 21 to enable the cone to smoothly draw the metal, and the cone is shown as having a slight shoulder at 22 to draw the flange portion 23 to substantially uniform wall thickness and roundness.

In practice the travel of the cone is preferably such as to draw the flange out through the central opening 21 in the base so that the tool may then be removed by simply lifting it off the pipe and without having to unscrew the cone to remove it from the interior of the pipe.

Fig. 5 shows the cone approaching the limit of outward travel, and it will be apparent from this view that with slight additional further outward movement the flange 23 will be drawn out fully through the opening in the base, permitting of this simple, exterior removal of the tool.

Fig. 6 shows the pipe with the flange 23 fully drawn out, ready to receive the connecting pipe.

Fig. 7 shows how the connecting pipe indicated at 24 may be beveled at 25 to wedge within the flange, and in this view the flange is shown as slightly expanded at 26 to form a receiving lip for the beveled portion.

The lip 26 may be flared out with a "top" or similar expanding tool.

After entering the beveled end of the branch pipe in the flange, the flared portion of the flange may be beaten or rolled down to present a smooth exterior, substantially as indicated at 27 in Fig. 8.

The invention thus provides a smooth, flush joint both inside and outside.

Before wiping on the solder, which has been shown as applied at 28 in Fig. 9, the pipe is usually soiled about the joint area and a special feature as to this is that the base may be used as a circular guard, shield and guide for the brush which is used to apply the soil.

This feature will be clear from consideration of Figs. 2 and 3, Fig. 2 showing the circular base fitted over the scraped area of the pipe, and Fig. 3 showing how the pipe appears after a ring of soil 29 has been wiped or brushed onto the pipe about the guiding edge of the base 20.

The concave base ring is designed to fit the pipe closely enough to exclude and prevent the soil entering the circular area of the solder joint, and this soil excluding or guarding action may be facilitated by waxing the inner surface of the ring before applying it to the pipe.

The invention involves but few parts, of simple, rugged construction and can be produced at relatively low cost. With this tool a uniform and much stronger joint can be made than those produced by the bending pins and hand tools heretofore used, and in much shorter time and at less expense.

To produce a substantially straight edge on the flange 23, as shown in Fig. 6, the pilot opening 11, Figs. 1 and 3, may be somewhat elongated so that the metal will be drawn up at the sides of this oval shape at a greater rate than the metal at the ends of the hole.

In order that the tool may be fitted closely to pipe of different sizes, bases may be provided of the required concave shape to fit the different pipes and these bases be interchangeably usable with the cone pulling mechanism.

Such a construction is shown in Figs. 10, 11 and 12, where the arch member 19' is made as a separate piece having flat feet portions 30 engageable over corresponding flat pad portions 31 on the interchangeable base rings 20'.

These base rings, as particularly shown in Figs. 11 and 12, are of different sizes and concaved on radii to fit the different diameter pipes with which the tool is to be used.

To locate the detachable arch firmly on the different size bases, pilot pins or equivalent may be employed. Fig. 10 shows how the base rings may carry pilot pins 32 to fit pilot openings 33 in the ends of the arch. This relation may be reversed or other forms of interlocking elements may be employed.

Where the joint is to be made at some distance from the end of the pipe, a wire such as shown at 34 may be employed for pulling the cone in from the end of the pipe into the hole 11 which has been cut in the side of the pipe.

As shown in broken lines at the left in Fig. 10, the cone 13 may be engaged over the wire and the end of the wire be bent or hooked as at 35 so that the cone will not slip off the end of the wire. The leading end of the wire may then be introduced into the pipe and a hook or other form of fishing tool may be employed to catch and pull the inner end of the wire up through the opening 11 cut in the pipe.

The end of the wire withdrawn through the hole may then be passed through a hole cut in the pullscrew 15', the latter, in this case, being "rifled" as shown at 36, to pass the wire.

After leading the wire through the pull screw the tool in its complete form may be applied over the hole in the pipe, as shown in Fig. 10, and the wire used to pull the cone up into engaged relation over the lower end of the bolt. The wire extending freely up through the hole in the bolt does not interfere with the turning of this member to pull the cone up through the flanged opening in the pipe.

Then, after the cone has been pulled up far enough to complete the flange, the entire tool, with the included wire, may be lifted off the pipe the same as in the first form of the tool described.

Cones of different sizes and shapes may be interchangeably used with the same pull screw and with the same or different base constructions.

What is claimed is:

1. A tool for drawing out a flange around an opening in a lead pipe, comprising a base ring concaved to fit the curvature of the pipe, said base ring having a flange drawing lip about the open center portion of the same and an outstanding support arched over the open center portion, a pull screw having a thrust bearing against said arched support and a flange drawing cone having screw connection with said pull screw, said pull screw having a bore therethrough and a wire caught to said cone and extending therefrom up through said bore and accessible at the outer end of the screw for pulling the cone into engaged relation over the inner end of the screw.

2. A tool for drawing out a flange around an opening in a lead pipe, comprising a base ring concaved to fit the curvature of the pipe, said base ring having a flange drawing lip about the open center portion of the same and an outstanding support arched over the open center portion, a pull screw having a thrust bearing against said arched support and a flange drawing cone having screw connection with said pull screw, said pull screw having a bore therethrough and a wire caught to said cone and extending therefrom up through said bore and accessible at the outer end of the screw for pulling the cone into engaged relation over the inner end of the screw, said arched support having a detachable thrust engagement against said base ring and being removable from the base ring to provide free space over the base ring for manipulation of the wire to pull the cone into position to be engaged with the screw.

JAMES LAKE, Jr.

References Cited in the file of this patent

UNITED STATES PATENTS

| Number | Name | Date |
|---|---|---|
| 418,983 | Munroe et al. | Jan. 7, 1890 |
| 1,177,877 | Lennon | Apr. 4, 1916 |
| 1,574,900 | Kellogg | Mar. 2, 1926 |
| 2,213,574 | Weston | Sept. 3, 1940 |
| 2,337,342 | Nordgren | Dec. 21, 1943 |

FOREIGN PATENTS

| Number | Country | Date |
|---|---|---|
| 5,493 | Great Britain | of 1880 |